No. 834,011. PATENTED OCT. 23, 1906.
C. LEFFLER.
MACHINE FOR MAKING BOOK COVERS.
APPLICATION FILED DEC. 30, 1904.

Witnesses
Frank S. Ober
Waldo M. Chapin

Inventor
Charles Leffler
By his Attorneys
Rosenbaum & Stockbridge

No. 834,011. PATENTED OCT. 23, 1906.
C. LEFFLER.
MACHINE FOR MAKING BOOK COVERS.
APPLICATION FILED DEC. 30, 1904.

Witnesses
Frank S. Ober
Waldo M. Chapin

Inventor
Charles Leffler
By his Attorneys
Rosenbaum & Stockbridge

No. 834,011. PATENTED OCT. 23, 1906.
C. LEFFLER.
MACHINE FOR MAKING BOOK COVERS.
APPLICATION FILED DEC. 30, 1904.

Witnesses
Inventor
Charles Leffler
By his Attorneys

No. 834,011. PATENTED OCT. 23, 1906.
C. LEFFLER.
MACHINE FOR MAKING BOOK COVERS.
APPLICATION FILED DEC. 30, 1904.

UNITED STATES PATENT OFFICE.

CHARLES LEFFLER, OF NEW YORK, N. Y.

MACHINE FOR MAKING BOOK-COVERS.

No. 834,011.  Specification of Letters Patent.  Patented Oct. 23, 1906.

Application filed December 30, 1904. Serial No. 239,007.

*To all whom it may concern:*

Be it known that I, CHARLES LEFFLER, a citizen of the United States, residing at the city of New York, in the borough of Brooklyn and State of New York, have invented certain new and useful Improvements in Machines for Making Book-Covers, of which the following is a full, clear, and exact description.

This invention is a machine for folding or hemming the edges of flexible book-covers. These flexible book-covers usually consist of a rectangular sheet of leather, imitation leather, cloth, or like flexible, material, upon the inside of which is pasted a thin sheet or sheets of paper, serving as a reinforce or lining for the cover. The lining of stiff covers is usually pasteboard or other rigid material that affords hard edges over which to fold or hem the edges of the outer cover; but in flexible book-covers this lining is so thin and light that its edge does not furnish a good support against which to fold the edges of the cover. Hence some difficulty arises in the manufacture of flexible covers.

The object of my invention is to produce a machine which will fold the edges of the outer cover inward over the edges of the thin lining and to perform this work accurately and evenly, producing a neat finished article.

The improved machine comprises a movable table upon which the prepared cover is placed, a follower arranged above the table and provided with movable blades which serve as temporary edges or margins over which the edges of the cover are folded, and means for withdrawing said temporary edges while simultaneously folding and compressing the edges of the cover to complete the operation. The covers when inserted in the machine have a coating of adhesive material on their edges, which secures the fold in position after it is made.

The details of the machine will be described in connection with the accompanying drawings, and the features of invention will be particularly pointed out in the claims.

Fig. 3 shows the completed cover folded into the form of a book, the leaves of the book being supposed to be bound in.

Figures 10, 16:
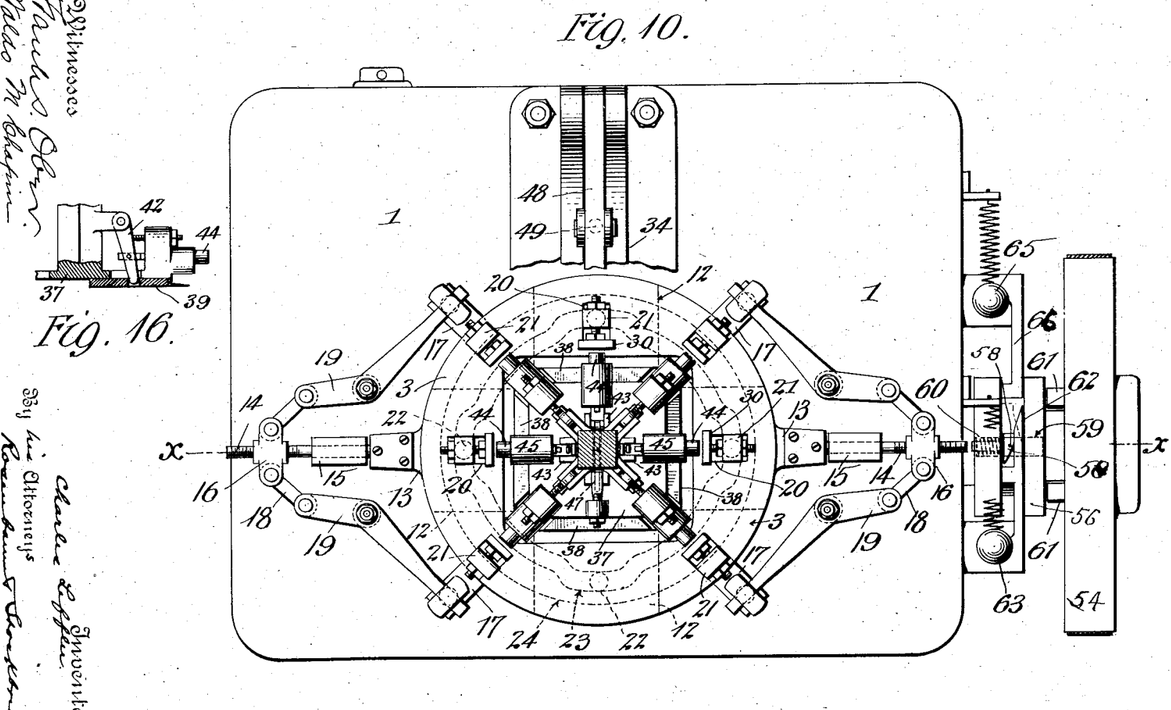
Fig. 10 is a plan of that part of the machine shown below the line $y\,y$ of Fig. 9.
Fig. 16 is a detail.
Figures 11, 17, 18:
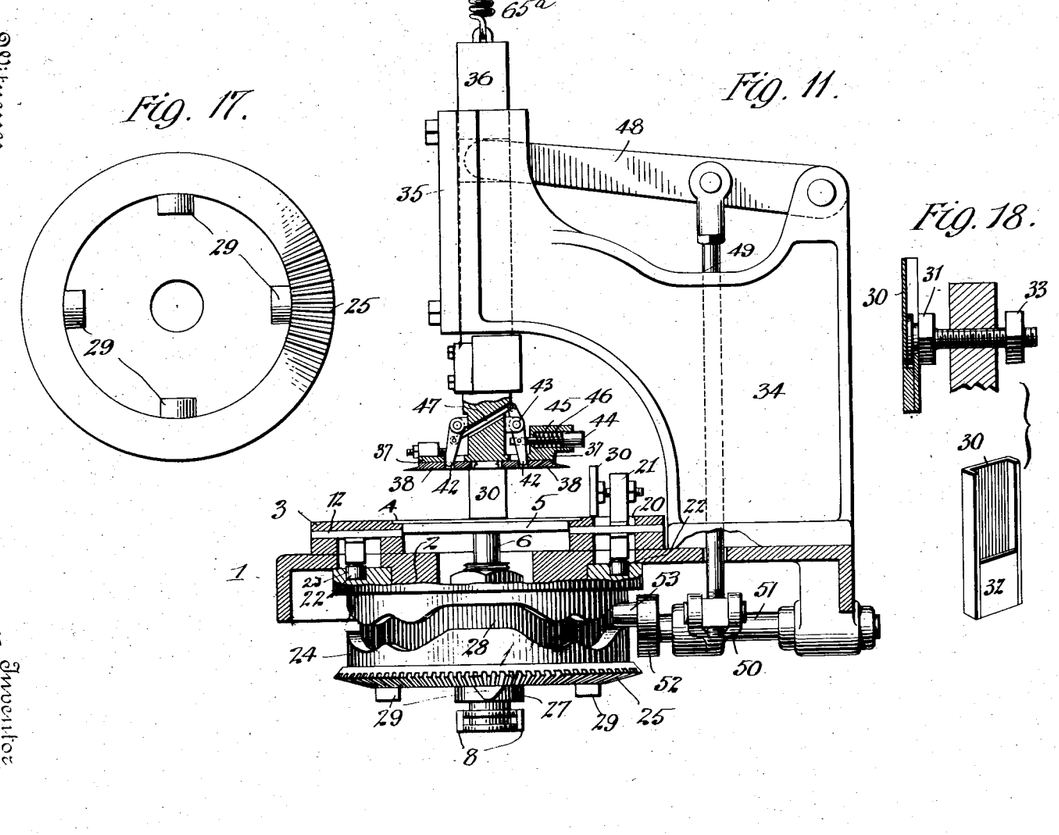
Fig. 11 is a section of the machine, taken at right angles to Fig. 9 and showing parts in elevation.
Fig. 17 is a face view of the main gear.
Fig. 18 shows two details.
Figures 12, 15:
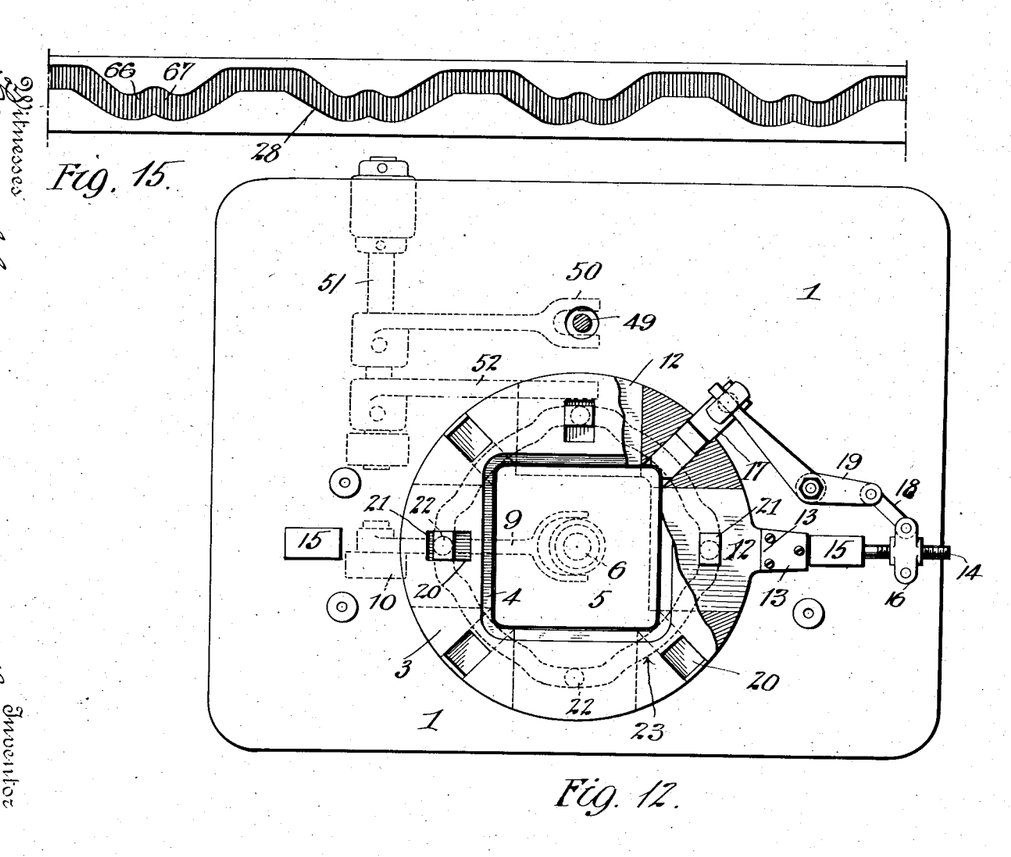
Fig. 12 is a plan, with parts broken away and other parts omitted, of the bed-plate and die.
Fig. 15 is a plan or projection of one of the cams.

Referring to the drawings by numerals of reference, 1 indicates the frame or bed-plate of the machine, provided with a cylindrical projection 2 on its under side. Fixed upon the bed-plate concentrically with this projection is a circular die 3, having a square central orifice, around the edges of which there is a slight countersink 4, equal in width to the width of the edge of the book-cover to be folded over. The orifice at the center instead of being square, as shown, may be oblong or any other shape corresponding to that of the outline of the book-cover. As most book-covers have rounded corners, this orifice, with the countersink around the edge, is likewise provided with rounded corners. Within this orifice is located a vertically-movable table 5, accurately fitting the orifice, but having sufficient clearance to move freely therein. This table is carried at the upper end of a plunger 6, having a bearing in the projection 2 and being normally pressed upward by a spring 7. The plunger at its lower end projects through this bearing and is engaged by a fork 8 on the lever 9, pivoted to a bracket 10. This lever carries a roller 11 on its upper side for a purpose which will hereinafter appear. The die 3 is provided opposite each side of the central orifice with horizontal passage-ways extending entirely through its walls from the inner orifice to the outer periphery. In each passage-way is located a flat plate or folder 12. Each plate fills its passage-way and is guided therein, its inner edge being normally a part of the wall of the orifice. Two of these plates have radial exterior lugs 13, Fig. 10, to which are attached outwardly-extending rods 14, moving in bearings 15 and carrying an adjustable nut 16. In addition to the four plates 12 there are four other plates alternating therewith. These latter plates are indicated by 17, and they project through similar but small passage-ways through the die 3 and along the diagonal lines of the orifice, so that the inner ends of said plates will move in and out across the corners of the orifice. The plates 12 and 17 all move inward at the same time and likewise outward at the same time, and in order to accomplish this the motion which is imparted to the plates 12 in the manner to be hereinafter described is transmitted to the plate 17 through the rods 14 and nuts 16, the latter being connected to links 18 and bell-cranks 19, which bell-cranks are connected with the outer ends of the plates 17. This system of levers, it will be seen, causes the plates 17 to move inward at the same time that the plates 12 partake of a similar motion. All of these plates are in the same horizontal plane. Opposite the middle of each of the plates 12 an oblong opening 20 is formed in the die 3 above and below the plate, and through this opening a post 21, carried by the plate, projects upward and downward. The lower end of each post carries a roller 22, which projects into an annular cam-groove 23 in a wheel or rotary element 24. (See dotted lines, Figs. 10 and 12.) This rotary element surrounds and bears upon the cylindrical projection 2, and its opposite or bottom face is provided with bevel gear-teeth 25, engaged by the driving-pinion 26 of the machine. The bearing for the plunger 6 projects through this wheel 24 and supports it in position by the collar 27. The exterior or rotary element 24 is provided with another annular cam-groove 28, and the bottom face of the rotary element is provided with four V-shaped projections 29, adapted to engage the roller 11 on lever 9. The upper ends of posts 21 carry cheeks 30, facing inward for a purpose which will hereinafter appear. These cheeks are adjustable outwardly and inwardly by the construction in Fig. 18, wherein it will be seen that the nut 31 has an annular groove into which a lip 32 fits, and as the lower end of the cheek rests against the flat top of the die 3 a wrench applied to the nut 31 will force the screw inward or outward without disconnecting the cheek. Nut 33 locks the cheek at any point of adjustment. The function of the cam 23 is to throw the plates 12 and, through the connections described, the plates 17, together with the cheeks 30, inward and outward simultaneously. The upper end of the post 21 and the corresponding cheek 30 are omitted from the front side of the machine, as shown in Fig. 11, to leave that portion of the die and table unobstructed, so that an operator can feed the covers into the machine without difficulty. The function that would be ordinarily performed by this omitted post and cheek is accomplished in another way, as will hereinafter appear.

At the back of the machine a bracket 34 rises and is provided with a vertical guide 35 for a plunger 36, which extends downward through the guide concentrically above the center of the orifice in the die and has attached to its lower end a horizontal rectangular plate 37, carrying on its under face opposite each straight edge, respectively, the four plates 38 and opposite the corners, respectively, the four plates 39. Each of these plates is attached to the main plate 37 by means of a dovetail guide in which it can slide radially. Each plate is provided with a hole 40, registering with an elongated hole 41 in the main plate 37, through both of which the end of a lever 42 projects from above, there being one lever for each of the plates 38 and 39. The levers 42 are pivoted to ears 43, projecting from the sides of the plunger 36, and all of the levers except the one directly in front of the plunger 36 are connected with small horizontal plungers 44 and are swung upon their pivots when said plungers are moved. The plungers are housed in small cylinders 45, carried by the plate 37, which also contain springs 46, adapted to force the plungers outward and carry the levers to the position shown in Fig. 9. The lever 42 immediately in front of the plunger 36 is connected with the corresponding lever at the back of the plunger by link 47, Fig. 11, extending through a passage in the plunger and connecting the upper end of one lever with the lower end of the other, so that when one lever is moved inward the other will be likewise moved inward.

The outer edges of all of the plates 38 and 39 are thinned down to a short knife-edge. The edges of the plates 38 are straight to correspond with the straight edges of the book-cover, while the edges of the plates 39 are curved to correspond with the curved corners of the book-cover. When the plates are in the outermost or distended position, they occupy a space the same size and shape as the table 5 and will fit neatly in the rectangular orifice, but when they are contracted or drawn inward they leave a margin around the table equal in width to the width of the rim or fold to be made on the book-cover.

The plate 37, with the parts it carries, I have designated as a "follower." It has a somewhat irregular movement in a vertical direction, obtained through a lever 48, link 49, crank 50, rock-shaft 51, crank 52, roller 53, and cam 28. The roller projects into the cam, and the oscillations imparted by the latter through the roller and crank 52 to the shaft 51 are transmitted to the plunger 36 and follower 37. The cam is constructed to lower the follower into the orifice of the die, then to lift it slightly, again lower it, and finally elevate it to the position shown in Figs. 9 and 11. This it does during each quarter-rotation of the wheel 24.

The driving mechanism comprises a loose pulley 54 on shaft 55, which carries the pinion 26. This pulley can be locked to and released from the shaft by means of a clutch mechanism consisting of a collar 56, having an annular groove 57, containing a beveled lug 58, projecting into the groove from a bolt 59, occupying a transverse orifice in the collar. The spring 60 behind the bolt tends to throw it to the right, Fig. 10, into the path of lugs 61 on the loose pulley. Normally the lug 56 is held to the left by the beveled point of a lever 62, which lies in the groove and between the lug and an inner shoulder of the collar. This lever is provided with a handle 63 and is pivoted at 64, by which its beveled end can be lifted out of the groove to release the bolt. When this is done, the bolt springs out and engages one of the lugs 61, and the power is transmitted to the machine from the pulley. A second lever 66, corresponding in all respects to lever 62, is provided and fitted with a handle 65 to normally rest in the groove of the collar on the opposite side from the lever 62 and pointing in the opposite direction, so that when the machine is started by lifting lever 66 out of the groove the main shaft is permitted to make a half-turn only, because the lug 56 is engaged by the second lever and the bolt 59 thrown back. Thus the machine has an intermittent movement of a half-turn of its main shaft at intervals controlled by the operator. This clutch mechanism is a very common device in other machines and no claim is made to it herein.

Figure 1:
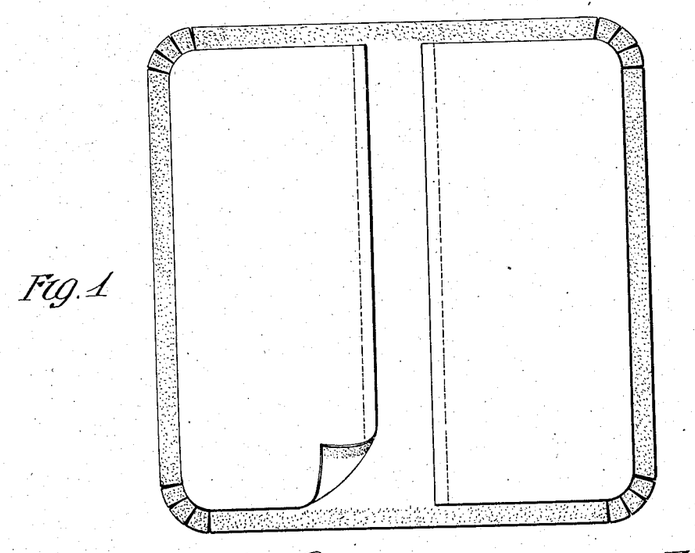
Figure 1 is a view of the inner face of a flexible book-cover, showing its condition when inserted in the machine.
Figure 2:
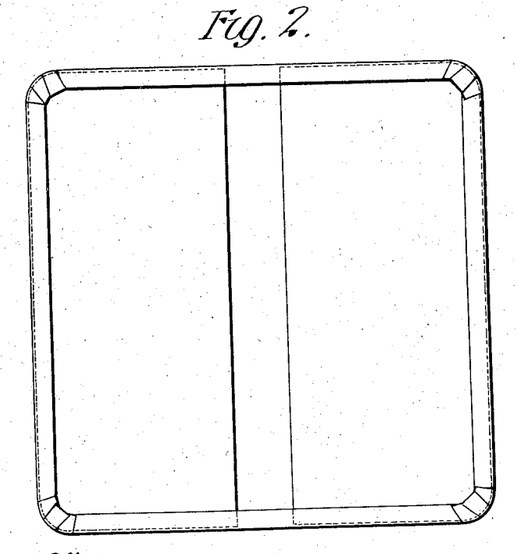
Fig. 2 is a similar view of the complete cover.
Figure 3:
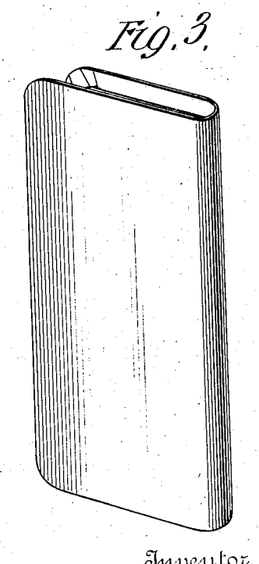
Figure 4:
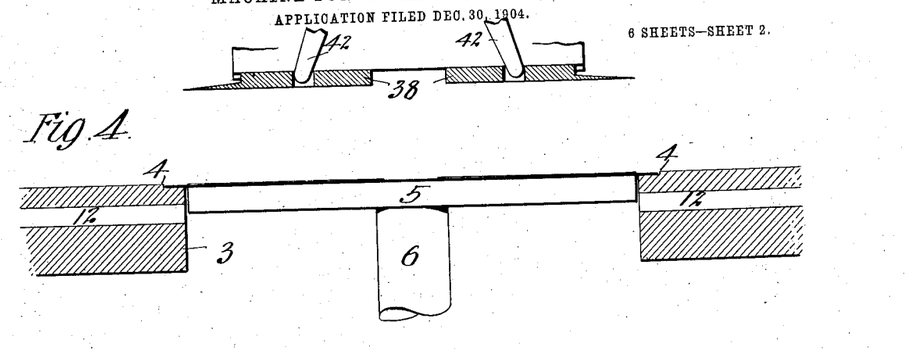
Figs. 4, 5, 6, 7, and 8 indicate conventionally the different steps of the operation through which the cover is passed in the machine.
Figure 5:
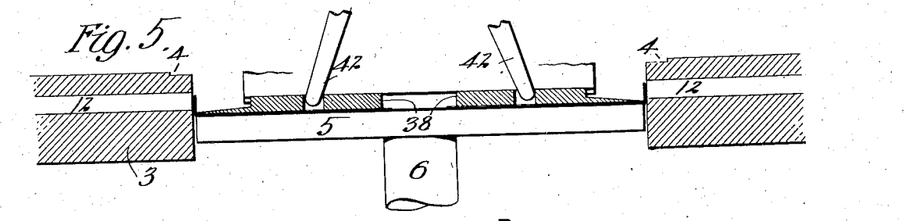
Figure 6:
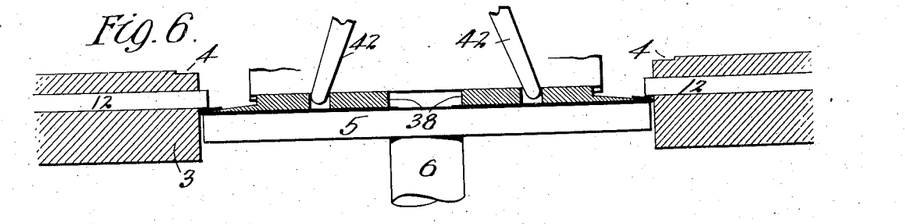
Figure 7:
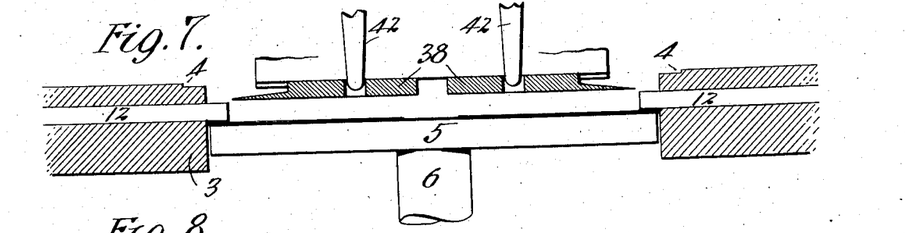
Figure 8:
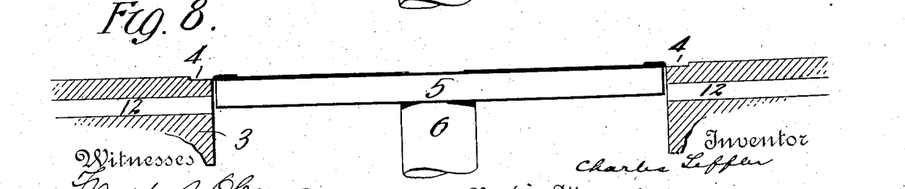

The operation is as follows: The operator feeds into the machine the book-covers prepared in the manner indicated in Fig. 1— that is, with the edges cut flat, covered with adhesive material and with the corners slit or gored to compensate for the smaller space they will occupy when folded in. The cover is placed upon the table 5 with its edges resting in the countersink 4, the purpose of this countersink being primarily to enable the operator to quickly find the proper position in the machine for the cover. The clutch is then thrown in and the main shaft allowed to make a half-turn in the manner before described. Cam 28 causes the follower to be moved down into contact with the cover and forces the table downward through the orifice in the die to the position shown in Fig. 5. This causes the edges of the cover to be turned up at right angles all around, a sharp bend being made against the edges of the blades 38 and 39. The follower stops at a point where the edge of the blades are immediately below the folding-plates 12 and 17. Next cam 23 acts upon all of the rollers 22 on the posts 21, drawing the plates 12 and 17 inward and turning the edges of the cover over inward, as shown in Fig. 6. After this initial movement, which serves to define the line along which the edge of the cover will bend or fold, the further inward movement of the plates 12 and 17 is accompanied by an inward movement of the blades 38 and 39, brought about by the cheeks 30 striking the plungers 44 and forcing them inward. Thus the blades are drawn inward simultaneously with the further movement of the plates and the blades thus removed from under the edge of the cover, so that the latter can be flattened down against the body of the cover. When the edges of the blades are finally clear of the edges of the plates, the rise 66 in cam 28 permits spring 65ª, attached to plunger 36, to lift the follower suddenly and allow the table to strike a blow against the under sides of the plates. (See Fig. 7.) This compresses the fold and causes the adhesive material to hold. Next the descent 67 in cam 28 again lowers the follower and forces the table below the plates 12 17, and on the final rise of the cam the fold is a second time compressed by the impact of the table against the plates, cam 23 withdraws plates 12 and 17, permitting the table to rise to the first position, (shown in Fig. 8,) and in order that this motion be not made too suddenly the roller 11 on lever 9 engages an incline of one of the cams 29, which retards the stroke of the table. At the same time the follower rises to the position shown in Fig. 4 by action of cam 28. The rotary element 24 makes a quarter-turn at each half-turn of the pinion 26. Therefore the cam 23 and the cam 28 are four-part cams, one part of the cam 28 acting at each motion of the machine, while all four parts of cam 23 act, respectively, upon the four plates 12 at each movement of the machine.

Figures 9, 13, 14:
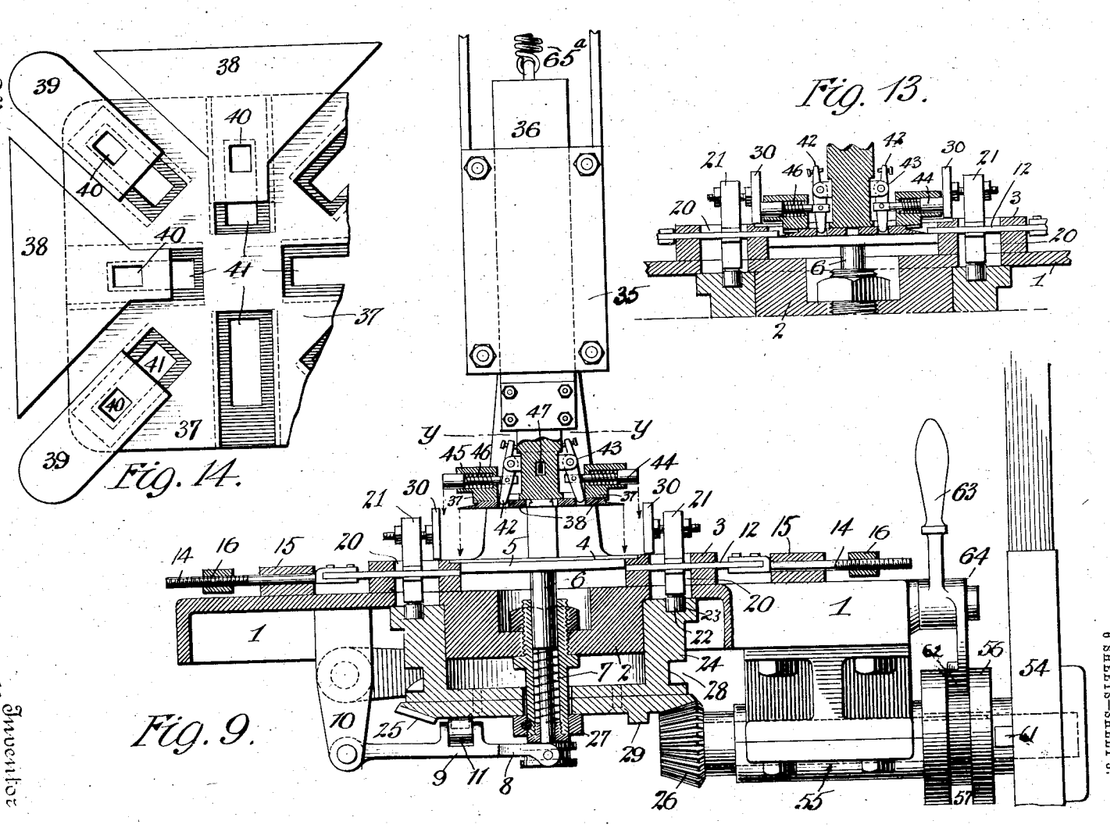
Fig. 9 is a vertical section of the machine along the line $x\,x$ of Fig. 10, parts being shown in elevation.
Fig. 13 is a section of the die and follower, showing the parts in a position opposite to that in which they are shown in Fig. 9.
Fig. 14 is a plan, with parts broken away, of the bottom of the follower.

To allow blades 38 and 39 to remain stationary while the plates 12 and 17 make their initial movement, there is a slight loss of motion between the face of the cheeks 30 and the ends of plungers 44. Upon the withdrawal of the plates 12 and 17 it is evident that the blades 28 and 29 are thrust outward by the springs 46. Fig. 13 shows the position of the parts at the completion of the folding and just before the follower rises from the table.

Having described my invention, I claim—

1. In a machine for folding the edges of book-covers, the combination of a die having a central opening, a table movable axially in and closely fitting such opening, means for imparting such movement to the table, a follower also movable axially in and closely fitting such opening, the follower being movable independently of the table, whereby such members can be brought together to clamp a cover between them and then both moved down into the opening in the die to bend up the edges of the cover, and folding-plates operating simultaneously in four perpendicular directions while said parts are in engagement with one another.

2. In a machine for folding the edges of book-covers, the combination of a die having a central opening, a table movable axially in and closely fitting such opening, a follower also movable axially in and closely fitting such opening, the follower being movable independently of the table, whereby such members can be brought together to clamp a cover between them and then both moved down into the opening in the die to bend up the edges of the cover, and folding-plates operating in a single horizontal plane and arranged to fold over the bent-up edges of the cover.

3. In a machine for folding the edges of book-covers, a die having a central opening, a table movable axially in and closely fitting such opening, a follower also movable closely in and fitting such opening, the follower being movable independently of the table, whereby such members can be brought together to clamp a cover between them and then move down into the opening in the die to bend up the edges of the cover, and folding-blades adapted to fold the upturned edges of the cover down upon the upper surface of the follower.

4. In a machine for folding the edges of book-covers, the combination of folding-plates, a die having a central opening, a table movable axially in and closely fitting such opening, a follower also movable axially in and closely fitting such opening, the follower being movable independently of the table, whereby such members can be brought together to clamp a cover between them and then both moved down into the opening in the die to bend up the edges of the cover, and means to cause the folding-plates to thereupon fold the bent-up edges of the cover down onto the follower, the follower having movable margins arranged to retreat from such folded edges, the table being also movable to and from the folding-plates to compress the folded edges of the cover therebetween.

5. In a machine for folding the edges of book-covers, the combination of a die having a central opening, a table closely fitting and movable axially in such opening, a follower movable axially in the opening in the die, the follower being provided with movable marginal blades arranged to normally closely fit the opening in the die, the follower being movable independently of the table whereby such members can be brought together to clamp a cover between them and then both moved down into the opening in the die to bend up the edges of the cover.

6. In a machine for folding the edges of book-covers, the combination of a die having a central opening, a table closely fitting and movable axially in such opening, a follower movable axially in the opening in the die, the follower being provided with movable marginal blades arranged to normally closely fit the opening in the die, the follower being movable independently of the table whereby such members can be brought together to clamp a cover between them and then both moved down into the opening in the die to bend up the edges of the cover, folding-plates in the die movable into its said opening, means for moving said plates to fold down said bent-up edges of the cover, onto the said follower-blades, and means for causing such latter movement to cause the blades to retreat from the folded edges.

7. In a machine for folding the edges of book-covers, the combination of a die having a central opening, a table closely fitting and movable axially in such opening, a follower movable axially in the opening in the die, the follower being provided with movable marginal blades arranged to normally closely fit the opening in the die, the follower being movable independently of the table whereby such members can be brought together to clamp a cover between them and then both moved down into the opening in the die to bend up the edges of the cover, folding-plates in the die movable into its said opening, means for moving said plates to fold down said bent-up edges of the cover onto the said follower-blades, means for causing such latter movement to cause the blades to retreat from the folded edges, and means for thereupon moving the table to compress such folded edges between it and the folding-blades.

8. In an edge-folding machine, the combination of a continuously-rotating driving member, a die having a central opening therein and a marginal rabbet in its face around the opening, a table closely fitting such opening and movable therein, means for yieldingly supporting the table with its face normally flush with the bottom of such rabbet in the die, and arranged to support a cover resting in the rabbet, and a follower closely fitting the opening in the die and movable to engage the table and force it and a cover thereon down into the die thereby folding up the margins of the cover, and means actuated from said driving member for imparting said movements.

9. In an edge-folding machine, the combination of a table, a follower movable to and from the table, a folding-blade movable across the table and having its edge sharply beveled, a movable folding-plate arranged to fold the edge of a cover over said edge of the blade, and means for causing the movement of the folding-plate to effect a relative movement of the blade whereby when the plate has moved over the edge of the blade and partly folded down the cover, the blade will be withdrawn from such edge simultaneously with the further advance of the folding-plate, substantially as set forth.

In witness whereof I subscribe my signature in the presence of two witnesses.

CHAS. LEFFLER.

Witnesses:
 FRANK S. OBER,
 WALDO M. CHAPIN.